April 24, 1945.   A. I. K:SON SLETTENGREN   2,374,625
TOOL HOLDER FOR PLATE SHEARING MACHINES
Filed July 13, 1944

Inventor;
Anders Ingemar K:son Slettengren
By: Glaswell Downing Lee & Co
Attorneys.

Patented Apr. 24, 1945

2,374,625

UNITED STATES PATENT OFFICE 2,374,625

TOOLHOLDER FOR PLATE SHEARING MACHINES

Anders Ingemar K:son Slettengren, Goteborg, Sweden, assignor to Fabriksaktiebolaget Haldataxametern, Halmstad, Sweden, a company of Sweden Application July 13, 1944, Serial No. 544,777
In Sweden July 26, 1943

6 Claims. (Cl. 164—47)

The present invention refers to plate shearing machines of the type provided with two cutting tools of a substantially rectangular cross section and adapted to operate against each other in their longitudinal direction. In plate shearing machines of this type it is of special importance for a satisfactory functioning of the machine that the cutting tools operate in the proper position relatively to each other. The present invention has for its object to provide for a convenient adjustment of the cutting tools relatively to each other in a lateral direction, and is substantially distinguished by the feature that one of the cutting tools, preferably the stationary tool, is adjustable in the tool holder laterally in parallel to itself by means of an adjusting member rotatably mounted in the machine frame or in the tool holder, said adjusting member taking the form of a cylindrical sleeve provided with a cylindrical guide surface eccentrically disposed relatively to the longitudinal axis of the tool while parallelling the same, said guide surface bearing on one side of the tool. In distinction from the previously known arrangements for the adjustment of cutting tools, the construction according to the invention allows of an adjustment of the cutting tools during the operation of the machine.

Figure 1:
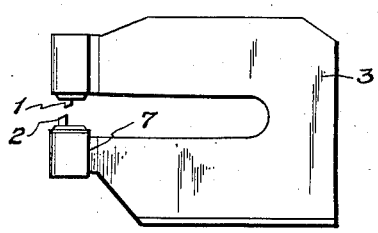
Figure 3:
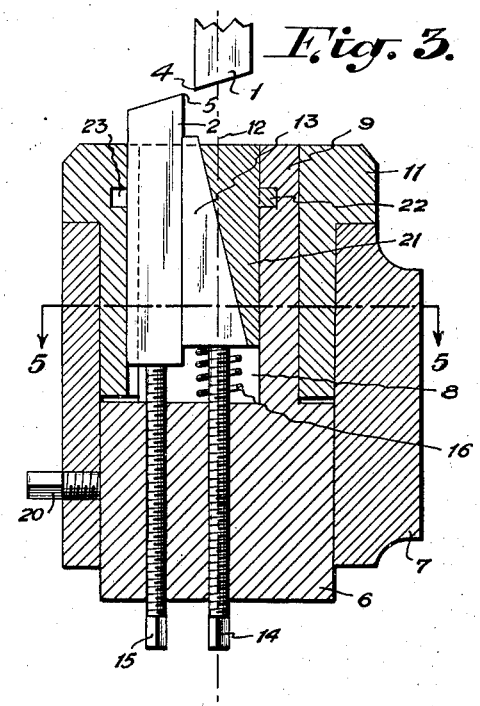
Figure 2:
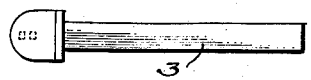
Figure 4:
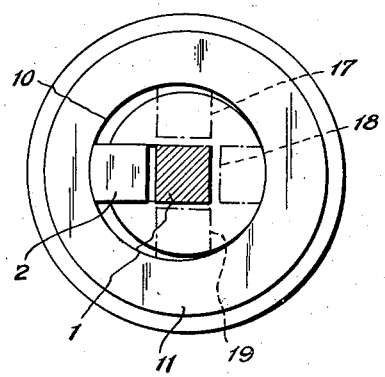
Figure 5:
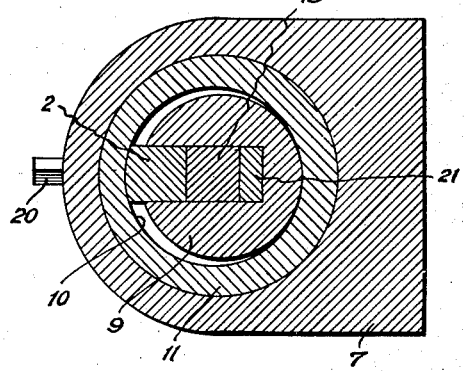

The invention will be described more closely hereinafter with reference to the accompanying drawing, which illustrates a form of embodiment of the invention. Figure 1 is an elevation of the plate shearing machine, and Figure 2 shows the same viewed from above. Figure 3 is a longitudinal section of the lower stationary tool holder. Figure 4 shows the tool holder as viewed from above, and Figure 5 is a cross section on the line 5—5 in Figure 3.

One of the two cutting tools 1, 2, that is to say the tool 2, is fixed in the machine frame, whereas a vertical reciprocating movement may be imparted to the other tool 1 by a driving means, not shown, the tool being thus caused to move in the longitudinal direction thereof. The tools consist of steel bars of a rectangular cross section, and are provided with bevelled-off end portions to form cutting edges 4, 5 thereon. To obtain a satisfactory functioning, it is of importance that these two edges take the proper position relatively to each other, both laterally and vertically. To this end, the lower cutting tool 2 is adjustably arranged in a cylindrical holder 6 which is rotatably arranged in the extreme end of the lower arm 7 of the frame within a bore substantially coaxial with the axis of the upper tool 1.

The tool 2 is inserted into a recess 8 milled sidewise in a radial direction into the upper narrow end portion 9 of the tool holder, in a manner such as to permit of being adjusted laterally as well as vertically by being displaced in said recess 8. The tool 2 then bears with the side thereof remote from the cutting edge on the inner cylindrical wall 10 of a cylindrical sleeve 11 thrust over the portion 9, said sleeve being inserted with its lower narrow end portion into the bore receiving the holder 6, and being mounted in this bore in a manner such as to permit of being turned coaxially with the tool holder 6. However, the sleeve, 11 may also be mounted rotatably and coaxially on the holder 6. The axis of the cylindrical guide surface 10 extends eccentrically relatively to the common axis 12 of the tool holder 6 and of the sleeve 11 while parallelling the same. The side of the tool 2 bearing on the guide surface 10 is of a cylindrical shape so as to bear on said guide surface with an accurate fit. On the opposite side, the tool bears over a wedge member 13 against the inclined rear wall of the recess 8, the tool permitting then of being fixed in its position by the setting of a set screw 14 against the lower side of the wedge member 13. To facilitate the preparation of the recess 8, the bottom portion thereof is made from a removable wedge-shaped piece 21 adapted to be retained in its place by means of a projection 22 entering a bore in the portion 9. This arrangement also makes it possible to vary the position of the lower tool relatively to the upper tool by causing the tool 2 and the wedge members 13, 21 to change places, for which purpose a recess 23 may be provided in the sleeve 11 to receive the projection 22. The tool 2 bears with its lower end on the upper end of a set screw 15, by means of which the tool may be accurately adjusted in the vertical direction.

At the adjustment of the tool 2 in a lateral direction, the screw 14 is first loosened, the wedge member 13 being then retained in part by the friction against its wedge surfaces and in part by means of a helical spring 16. After that the sleeve 11 is turned, the tool being then actuated by the eccentrical cylindrical guide surface in such manner as to be displaced in parallel to itself. The wedge member 13 is thus forced aside against the action of the spring 16, so that the tool will always bear on the guide surface 10. The lateral adjustment having been effected the tool is fixed in its adjusted position by setting the screw 14 against the end of the wedge member 13.

This lateral displacement of the tool may also be effected during the operation of the machine.

As stated, the tool holder 6 is rotatably mounted in the arm 7 of the frame. Hereby shifting of the lower tool 2 relatively to the upper tool is rendered possible in the manner indicated in Figure 4. By turning the holder 6, the tool 2 may thus be caused to take one of the positions 17, 18, 19 as indicated by chain-dotted lines. Here, the upper tool 1 must of course be correspondingly turned in its holder, so that the cutting edges of the two tools may cooperate. In this way, the cutting plane may be adjusted into four different positions. The tool holder may be fixed in the position of adjustment by means of a screw 20. If desired, the wedge member 13 and the tool 2 may also change places, whereby a fifth position for the cutting plane may be obtained upon corresponding adjustment of the upper tool 1.

I claim:

1. A tool holder for plate shearing machines of the type having two cutting tools of a substantially rectangular cross section and operating against each other in their longitudinal direction, one of the cutting tools being stationary, means for adjusting the stationary tool laterally, including an adjusting member rotatably mounted in the holder, said adjusting member having the form of a cylindrical sleeve provided with an inner guide surface which is eccentric relatively to the longitudinal axis of the tool holder, while parallelling the same, said guide surface bearing on one side of the stationary tool.

2. A tool holder as claimed in claim 1 in which the stationary tool is adjustably arranged within a recess provided sidewise in a lateral direction in the tool holder and a wedge member for jamming the tool between the bottom portion of said recess and the cylindrical guide surface.

3. A tool holder, as claimed in claim 1, in which the tool holder is provided with a recess in which the stationary tool is adjustably arranged, a wedge member for holding said tool in its adjusted position and a spring cooperating with said wedge member and tending to keep the wedge member in its operative position.

4. A tool holder as claimed in claim 1 in which the tool holder is provided with a recess in which the stationary tool is adjustably arranged, a wedge member for holding the tool in its adjusted position and a screw acting upon the end of the wedge member for fixing the position of adjustment of the tool.

5. A tool holder as claimed in claim 1 in which the tool holder for the stationary tool is rotatable around an axis substantially coinciding with the longitudinal axis of the movable tool in a manner such that the stationary tool may be shifted into various angular or lateral positions relatively to the movable tool.

6. A tool holder as claimed in claim 1 in which the tool holder and the adjusting sleeve are coaxially mounted.

I. SLETTENGREN.